2,803,549
PROCESS OF PRODUCING CANDY

John A. Bernard, Cincinnati, and Roman Verdin, Hamilton, Ohio

No Drawing. Application October 22, 1953, Serial No. 387,782

2 Claims. (Cl. 99—134)

This invention relates to improvements in a food product, preferably, a candy composition, and to improvements in the process of producing same.

Candy is a food product processed from a combination of ingredients primarily produced to satisfy the palate and the desire for sweets. The candy of the present invention will accomplish this primary function and at the same time will act as a vehicle or medium for introducing into the system highly desirable elements which ordinarily is taken by an individual in the form of a capsule since its taste is not particularly appealing. The product of the present invention, further, while primarily in the nature of candy and highly sought after by children will, therefore, be the means of supplying children, as well as adults, with an ingredient highly desirable to the human system and which ingredient is not at present taken in the quantities that it should be taken.

It is well known that bone meal has properties, due to the elements thereof, that are highly beneficial to the human system in the same manner that bone meal is beneficial to the animals of the lower order, and to whom bone meal is given as a regular part of their diet.

It has been found, however, that bone meal must be handled in a particular manner when incorporating same with other ingredients in the production of a palatable product, such as candy.

The principal object of the present invention is, therefore, the provision of an improved process for the handling and the incorporation of bone meal with other ingredients to produce a palatable food product.

Another object of this invention is the provision of a composition of matter in the form of candy in which one of the ingredients is bone meal.

A further object of the present invention is the provision of a product that accomplishes the foregoing objects and which is highly palatable so that its use and consumption are not objected to.

Other objects and advantages of the present invention will be readily apparent from the following specification, and it is to be understood that variations in the proportions of the ingredients and the specific steps of the hereinafter disclosed processes may be made within the scope of the appended claims.

In the main, candy, candy fondant, and other confectionery products, have been produced which contain the basic candy ingredients of the present composition, and which would include sugar, glucose, shortening, milk and dextrose, together with a flavoring agent such as vanilla and carmelite. It is therefore, not the purpose of the present invention to claim a composition composed of these basic ingredients alone.

The above ingredients in proper proportion to one another would produce, as noted above, a candy, candy fondant, or other confection that would be tasty to the palate and supply the desire for sweets, but would serve no particular additional purpose or function.

It has been found that the above ingredients may have incorporated therewith bone meal which would not materially affect the taste of the candy, candy fondant or confection, yet would supply the human system with very highly desirable and in most cases, much needed elements.

As is well known, bones, from which bone meal is produced, contain large quantities of calcium and phosphorus, two elements that are needed in the human system for the production of proper bone tissue and tooth structure, as well as for restoring energy to the nervous system. In other words, the human system needs calcium, which is obtained from numerous sources and in various foods, but not, generally, in sufficient quantity, to build the preferred bone and tooth structures, and the human system needs phosphorus, which is again obtained in various foods, but, again, generally, not in sufficient quantity to supply sufficient energy for the nervous system of the body. These deficiencies can be readily made up by the consumption of relatively small quantities of bone meal which should be consumed in a given period of time and repeated during each succeeding similar period of time.

One analysis of raw bone meal as furnished from the United States Department of Agriculture indicates the following minerals and elements and the amounts as:

| | Percent |
|---|---|
| Sodium oxide ($Na_2O$) | 0.46 |
| Potassium oxide ($K_2O$) | 0.20 |
| Calcium oxide ($CaO$) | 30.52 |
| Magnesium oxide ($MgO$) | 0.73 |
| Barium oxide ($BaO$) | 0.001 |
| Copper oxide ($CuO$) | 0.0005 |
| Iron oxide ($Fe_2O_3$) | 0.004 |
| Manganese oxide ($MnO$) | 0.0014 |
| Lead oxide ($PbO$) | 0.005 |
| Zinc oxide ($ZnO$) | 0.018 |
| Chlorine ($Cl$) | 0.22 |
| Carbon dioxide ($CO_2$) | 1.59 |
| Phosphoric oxide ($P_2O_5$) | 22.52 |
| Boron oxide ($B_2O_3$) | Trace |
| Flourine ($F$) | 0.043 |
| Iodine ($I$) | 0.00002 |
| Sulfur ($S$) | 0.25 |
| Organic matter | 34.88 |
| Moisture | 6.76 |

From the above table it will be noted that calcium oxide and phosphoric oxide, the source of calcium and phosphorus, are present in quite large quantities by comparison with the remaining elements in bone meal, with the one exception of the organic matter. From this it follows that bone meal is an excellent source for calcium and phosphorus for the human system.

The raw bone meal is, of course, treated and processed to produce a usable product and from which the moisture is driven, wherefore the bone meal, as employed in the product of the present invention, is a relatively dry powder-like or meal like substance.

In producing the candy, candy fondant or confection of the present invention, the basic ingredients, that is all of the above ingredients with the exception of bone meal, are, or may be, subjected to the usual heating and boiling processes as will be hereinafter more fully set forth. In the use of bone meal it cannot be subjected to the temperature necessary for processing the other ingredients without causing a burning or scorching of the bone meal and which would result in the bone meal having an unpalatable taste.

The following specific process is desirable in the production of a candy, candy fondant or confection and which specifically is as follows:

The sugar, milk, shortening and glucose are first mixed together and heated to a boiling point of 242 degrees Fahrenheit, stirring constantly during said boiling. Care should be exercised that the temperature during the boiling of these ingredients does not exceed 242 degrees Fahrenheit, since to do so may result in the mass becoming too sticky for convenient usage. The mixture is then allowed to cool to a temperature of between 140 and 160 degrees Fahrenheit. The bone meal, flavoring and dextrose are now added and stirred into the mixture. After the complete mixture has been thoroughly stirred, it is then set aside for further cooling and is then poured into molds to obtain the ultimate formation of the product.

It has been found that bone meal subjected to a temperature in excess of 160 degrees Fahrenheit rapidly chars or scorches to the point of giving the same an unpalatable taste wherefore it cannot be added to the hot or boiling mixture until the said mixture reaches a temperature of at least 160 degrees Fahrenheit. It is preferable that the temperature of the mixture be allowed to cool to approximately 155 degrees Fahrenheit before the bone meal, flavoring and dextrose are added.

If the mixture of sugar, milk, shortening and glucose is allowed to cool below 140 degrees Fahrenheit, it will become too stiff to have the bone meal, flavoring and dextrose stirred therein to provide an evenly distributed product.

The finished product may take any suitable or desirable form, it being contemplated to utilize molds in bar form into which the mixture is placed for the final cooling thereof.

It should be noted that the bone meal is a purified product suitable for human consumption as distinguished from a less pure product that would be perfectly suitable for consumption by the lower animals. It should also be noted that preferably, use is made of condensed milk as distinguished from whole or skimmed milk as is frequently employed in the manufacture of candy, candy fondants and other confections.

A specific product may have the following specific amounts of ingredients:

| Ingredient: | Grains |
| --- | --- |
| Sugar | 35,000 |
| Glucose | 21,000 |
| Shortening (cottonseed oil) | 875 |
| Milk (condensed) | 21,000 |
| Dextrose | 875 |
| Vanilla (flavoring) | 3 |
| Carmelite (flavoring) | 434.5 |
| Bone meal (purified) | 1,848 |
| | 81,035.5 |

It will be noted that the above ingredients give a total of 81,035.5 grains of material for a batch and after processing, as above set forth, there will result 88 units or bars of candy each having a weight of two ounces or 875 grains each. The total weight of said 88 units or bars will be 77,000 grains making a loss in the weight of 4,035.5 grains during processing. Since, however, the bone meal was added to the mixture after the boiling step in the process, there has been no loss of said ingredient, wherefore each two ounce unit or bar of finished product will contain 21 grains of bone meal evenly distributed throughout the said product. Twenty-one grains of bone meal is the desired amount that can be assimilated by the body in a 24-hour period, wherefore a unit or bar of candy of the present invention would supply a desirable amount of bone meal. The said bar of candy may be consumed at any one time or parts thereof consumed at different times during a day. With this thought in mind, the candy bar will preferably be divided into thirds allowing the consumer to distribute his intake of bone meal throughout the day.

From the foregoing it will now be appreciated that there has been provided a food product which has the advantage of satisfying a user's desire for sweets and at the same time providing desirable minerals for proper growth and health.

What is claimed is:

1. The process of producing candy, candy fondant, and confection consisting of mixing together sugar, glucose, shortening and milk, bringing said mixture to a boil at a temperature of approximately 242 degrees Fahrenheit, cooling the said mixture to a point of between 140 and 21,000 grains of condensed milk, heating said mixture dextrose, flavoring, and purified bone meal, and allowing the mixture to further cool, and pouring the cooled mixture into molds for final setting into units or bars.

2. The process of producing a candy, candy fondant or confection comprising mixing 35,000 grains of sugar, 21,000 grains of glucose, 875 grains of cottonseed oil, and 21,000 grains of condensed milk, heating said mixture to a boiling point of 242 degrees Fahrenheit, stirring the mixture during the heating and boiling thereof, cooling said mixture to approximately 155 degrees Fahrenheit, stirring into the cooled mixture 875 grains of dextrose, 3 grains of vanilla, 434.5 grains of carmelite and 1,848 grains of purified bone meal, placing said mixture into molds for further cooling and setting to provide bars of approximately two ounces each having evenly distributed therein the purified bone meal.

References Cited in the file of this patent

UNITED STATES PATENTS

| 1,074,483 | Wolf et al. | Sept. 30, 1913 |
| 1,765,867 | Granger | June 24, 1930 |
| 1,927,640 | Granger | Sept. 19, 1933 |
| 1,983,568 | Robinson et al. | Dec. 11, 1934 |
| 2,496,634 | Melnick | Feb. 7, 1950 |

UNITED STATES PATENT OFFICE

CERTIFICATE OF CORRECTION

Patent No. 2,803,549                                        August 20, 1957

John A. Bernard et al.

It is hereby certified that error appears in the printed specification of the above numbered patent requiring correction and that the said Letters Patent should read as corrected below.

Column 4, line 30, for "21,000 grains of condensed milk, heating said" read -- 160 degrees Fahrenheit, stirring into the cooled --; line 37, for "beating" read heating --.

Signed and sealed this 29th day of October 1957.

(SEAL)

Attest:

KARL H. AXLINE
Attesting Officer

ROBERT C. WATSON
Commissioner of Patents